US010795660B1

(12) United States Patent
Sundresh

(10) Patent No.: US 10,795,660 B1
(45) Date of Patent: Oct. 6, 2020

(54) LIVE CODE UPDATES

(71) Applicant: Twitter, Inc., San Francisco, CA (US)

(72) Inventor: Sameer Sundresh, Berkeley, CA (US)

(73) Assignee: Twitter, Inc., San Francisco, CA (US)

(*) Notice: Subject to any disclaimer, the term of this patent is extended or adjusted under 35 U.S.C. 154(b) by 0 days.

(21) Appl. No.: 16/208,541

(22) Filed: Dec. 3, 2018

Related U.S. Application Data

(63) Continuation of application No. 15/067,015, filed on Mar. 10, 2016, now Pat. No. 10,146,522.

(60) Provisional application No. 62/130,611, filed on Mar. 10, 2015.

(51) Int. Cl.
| G06F 9/445 | (2018.01) |
| G06F 8/65 | (2018.01) |
| G06F 8/41 | (2018.01) |
| G06F 8/71 | (2018.01) |

(52) U.S. Cl.
CPC ............... G06F 8/65 (2013.01); G06F 8/41 (2013.01); G06F 9/44521 (2013.01); *G06F 8/71* (2013.01)

(58) Field of Classification Search
CPC .......................... G06F 9/44521; G06F 9/44536
See application file for complete search history.

(56) References Cited

U.S. PATENT DOCUMENTS

| 5,974,428 | A | * | 10/1999 | Gerard | ................. | G06F 8/71 |
| | | | | | | 707/695 |
| 6,272,674 | B1 | * | 8/2001 | Holiday, Jr. | ........ | G06F 9/44521 |
| | | | | | | 717/174 |
| 6,658,573 | B1 | * | 12/2003 | Bischof | ..................... | G06F 9/54 |
| | | | | | | 707/999.009 |
| 6,845,503 | B1 | * | 1/2005 | Carlson | ..................... | G06F 8/65 |
| | | | | | | 717/166 |
| 6,944,846 | B2 | * | 9/2005 | Ryzhov | ................... | G06F 9/454 |
| | | | | | | 717/116 |
| 7,039,923 | B2 | * | 5/2006 | Kumar | ................ | G06F 9/44521 |
| | | | | | | 719/331 |

(Continued)

OTHER PUBLICATIONS

Liang,Sheng, and Gilad Bracha. "Dynamic Class Loading in the Java [TM] Virtual Machine." ACM sigplan notices 33 (1998): 36-44. (Year: 1998).*

(Continued)

*Primary Examiner* — Matthew J Brophy
(74) *Attorney, Agent, or Firm* — Fish & Richardson P.C.

(57) ABSTRACT

A software developer tool allows for live code updates (LCU) while an application is running using an execution platform. The LCU update service operates by preemptively, automatically rewriting bytecode to introduce a layer of indirection that swaps out the code of a running application to make it easy to dynamically update whenever the code is changed. The indirection includes both new "representation" classes (and constituent fields and methods), and also replacing constructs that are hard-coded into the bytecode with more flexible constructs such as representation object maps and a dynamic global class table. All manner of code modifications are handled including adding, removing and modifying fields and methods of classes, and changing the class hierarchy. This includes arbitrary code changes, ensuring that when a developer changes a class, all objects of or related to that class are instantly updated.

20 Claims, 7 Drawing Sheets

(56) References Cited

U.S. PATENT DOCUMENTS

| | | | | |
|---|---|---|---|---|
| 7,076,768 | B2* | 7/2006 | Li | G06F 9/44521 717/132 |
| 7,089,583 | B2* | 8/2006 | Mehra | G06F 9/4488 726/3 |
| 7,539,982 | B2* | 5/2009 | Stuart | G06F 16/80 717/140 |
| 7,703,089 | B2* | 4/2010 | Birenheide | G06F 9/44536 717/166 |
| 7,770,159 | B2* | 8/2010 | Pepin | G06F 9/4493 717/138 |
| 7,779,408 | B1* | 8/2010 | Papineau | H04W 4/00 709/219 |
| 7,882,501 | B1* | 2/2011 | Carlson | G06F 8/656 717/167 |
| 8,261,297 | B2* | 9/2012 | Kabanov | G06F 9/449 719/332 |
| 8,612,930 | B2* | 12/2013 | Quinn | G06F 9/44536 717/106 |
| 8,707,287 | B2* | 4/2014 | Raundahl Gregersen | G06F 8/656 717/168 |
| 8,745,643 | B2* | 6/2014 | Kabanov | G06F 9/449 719/332 |
| 9,411,617 | B2* | 8/2016 | Raundahl Gregersen | G06F 8/656 |
| 9,798,557 | B2* | 10/2017 | Gagliardi | G06F 8/656 |
| 9,910,680 | B2* | 3/2018 | Goetz | G06F 9/4492 |
| 10,083,014 | B2* | 9/2018 | Buckley | G06F 11/3664 |
| 10,158,647 | B2* | 12/2018 | Buckley | G06F 21/629 |
| 10,367,822 | B2* | 7/2019 | Buckley | G06F 21/629 |
| 2002/0049603 | A1* | 4/2002 | Mehra | G06F 9/465 726/3 |
| 2002/0143941 | A1* | 10/2002 | Rich | G06F 8/24 709/225 |
| 2003/0048287 | A1* | 3/2003 | Little | G06F 9/45512 715/705 |
| 2003/0101445 | A1* | 5/2003 | Li | G06F 9/44521 717/170 |
| 2003/0126310 | A1* | 7/2003 | Ryzhov | G06F 9/445 719/328 |
| 2003/0200350 | A1* | 10/2003 | Kumar | G06F 9/445 719/315 |
| 2004/0015936 | A1* | 1/2004 | Susarla | G06F 9/44521 717/166 |
| 2004/0255294 | A1* | 12/2004 | Spotwood | G06F 9/445 717/176 |
| 2005/0216885 | A1* | 9/2005 | Ireland | G06F 9/4488 717/108 |
| 2006/0248140 | A1* | 11/2006 | Birenheide | G06F 9/44536 709/203 |
| 2008/0282266 | A1* | 11/2008 | Kabanov | G06F 11/3696 719/320 |
| 2009/0064099 | A1* | 3/2009 | Foley | G06F 8/433 717/110 |
| 2010/0199259 | A1* | 8/2010 | Quinn | G06F 9/44521 717/106 |
| 2011/0283256 | A1* | 11/2011 | Raundahl Gregersen | G06F 8/656 717/108 |
| 2012/0324433 | A1* | 12/2012 | Kabanov | G06F 9/44536 717/166 |
| 2013/0227103 | A1* | 8/2013 | Garimella | H04L 41/5054 709/223 |
| 2014/0019948 | A1* | 1/2014 | Goetz | G06F 8/437 717/143 |
| 2014/0059527 | A1* | 2/2014 | Gagliardi | G06F 9/44521 717/166 |
| 2015/0100951 | A1* | 4/2015 | Raundahl Gregersen | G06F 9/44521 717/166 |
| 2015/0301825 | A1* | 10/2015 | Goetz | G06F 8/437 717/122 |
| 2016/0232017 | A1* | 8/2016 | Raundahl Gregersen | G06F 9/45508 |
| 2017/0068520 | A1* | 3/2017 | Buckley | G06F 11/3664 |
| 2018/0364989 | A1* | 12/2018 | Buckley | G06F 11/3664 |

OTHER PUBLICATIONS

Chiba, Shigeru. "Load-time structural reflection in Java." European Conference on Object-Oriented Programming. Springer, Berlin, Heidelberg, 2000. (Year: 2000).*

Tatsubori, Michiaki, et al. "OpenJava: A class-based macro system for Java." Workshop on Reflection and Software Engineering. (Year: 1999).*

Geffken, Manuel, and Peter Thiemann. "Side effect monitoring for Java using bytecode rewriting." Proceedings of the 2014 International Conference on Principles and Practices of Programming on the Java platform: Virtual machines, Languages, and Tools. 2014. (Year: 2014).*

Archive of "IntelliJ IDEA—JRebel 6.2.7 Documentation," www.zeroturnaround.com, 7 pages, [online] [Archived by http://archive.org on Nov. 28, 2015; Retrieved on Oct. 10, 2017] Retrieved from the internet <URL: https://web.archive.org/web/20151128152025/http://manuals.zeroturnaround.com:80/jrebel/ide/intellij.html>.

Archive of "Eclipse—JRebel 6.2.6 Documentation," www.zeroturnaround.com, 6 pages, [online] [Archived by http://archive.org on Nov. 1, 2015; Retrieved on Oct. 10, 2017] Retrieved from the internet <URL: https://web.archive.org/web/20151101094034/http://manuals.zeroturnaround.com:80/jrebel/ide/eclipse.html>.

Archive of "NetBeans IDE—JRebel 6.2.7 Documentation," www.zeroturnaround.com, 7 pages, [online] [Archived by http://archive.org on Nov. 10, 2015; Retrieved on Oct. 10, 2017] Retrieved from the internet <URL: https://web.archive.org/web/20151110121905/http://manuals.zeroturnaround.com:80/jrebel/ide/netbeans.html>.

Archive of "Agent settings—JRebel 6.2.6 Documentation," www.zeroturnaround.com, 3 pages, [online] [Archived by http://archive.org on Nov. 1, 2015; Retrieved on Oct. 10, 2017] Retrieved from the internet <URL: https://web.archive.org/web/20151101100148/https://manuals.zeroturnaround.com:80/jrebel/misc/index.html>.

Archive of "Learn zeroturnaround.com," www.zeroturnaround.com, 3 pages, [online] [Archived by http://archive.org on Mar. 9, 2016; Retrieved on Oct. 10, 2017] Retrieved from the internet <URL: https://web.archive.org/20160309102847/https://zeroturnaround.com/software/jrebel/learn/>.

Gregersen et al., "Jaeleon: An Integrated Platform for Dynamic Software Updating and Its Application in Self-Systems", Engineering and Technology (2012).

Hlopko et al., "Towards a Runtime Code Update in Java," DATESO 2013.

Pukall et al., "JavAdaptor—Flexible runtime updates of Java applications", Software Practice and Experience 43 2 (2013): 153-185.

* cited by examiner

Example Representation Object Map

| Key (e.g., <defining_class.field_name>) | Value (e.g., <field_value>) |
|---|---|
| BaseClass.VariableA | 10 |
| BaseClass.VariableB | word |
| BaseClass.VariableC | -0.75930 |

*FIG. 7*

Global Class Table

| Key (e.g.,) <index> | Value (e.g., <class containing current version of methods>) |
|---|---|
| 0 | M¦BaseClass |
| 1 | M¦UserClassA¦2  →  M¦UserClassA¦3 |
| 2 | M¦UserClassB¦1 |

*FIG. 8*

LIVE CODE UPDATES

CROSS REFERENCE TO RELATED APPLICATIONS

This application is a continuation of U.S. patent application Ser. No. 15/067,015, filed Mar. 10, 2016, now U.S. Pat. No. 10,146,522, which claims the benefit of U.S. Provisional Application No. 62/130,611, filed Mar. 10, 2015, which is incorporated by reference in its entirety.

BACKGROUND

This specification relates generally to software development tools, and more specifically to the use of code postprocessing to update application bytecode without losing application state information Software developers often program iteratively. A developer writes some code, performs a build process on the code, deploys and initializes the code, and then runs the code to test it out. The developer can then go back make some changes and iterate through this process again. If the developer is able to iterate quickly, he or she can try out many ideas to understand how a system works and converge on a good solution relatively quickly.

The build/deploy/initialize parts of the process mentioned above can be relatively quick in some development environments, and can take longer in others, on the order of a few minutes if not longer. While this delay is generally acceptable for some developers and development environments, it is not acceptable in others.

Some execution platforms allow an application to be modified while it is running under very limited circumstances. For example, the JAVA VIRTUAL MACHINE (JVM) supports a limited form of updating the code of methods, known as method replacement. The JVM does not directly support the ability to make arbitrary changes to the code of a running application, such as changes to the class hierarchy, fields, and methods. Extension platforms such as JREBEL do allow live code modification, but they rely on making changes to the underlying execution platform (the JVM for JREBEL). Further, these modified execution platforms do not provide any support for mobile hardware platforms, such as Android.

Relatedly, systems such as the Open Services Gateway initiative (OSGi)s and some JVM or Common Language Runtime (CLR)-based web frameworks support faster restarting of components of a program. However, restarting a software component loses all objects from a previous iteration of the component unless the component was explicitly designed and coded to save and restore its state.

SUMMARY

A tool for use by software developers is described that allows for live code updates (LCU) to a running application without the need to fully rebuild/re-deploy/restart the application, and using an execution platform such as the JVM. To set up the application so that live code updating can be used, at least a subset of the source code of the application is compiled to produce an application bytecode. The LCU process identifies a user class in the application bytecode where the user class is a subclass of a superclass. The LCU process modifies the application bytecode to represent instances of the user class with instances of an instance representation class including a set of fields including a class identifier and a representation object map. The LCU process further replaces a call to allocate a new instance of the user class with a call to instantiate an instance of an uninitialized object class, where the uninitialized object class includes a set of fields that also include a representation object map and a class identifier. The representation object map of the instance of the uninitialized object class is initially empty, and the class identifier of the instance of the uninitialized object class identifies the user class.

The LCU process determines whether an immediate superclass of the user class is a system class, and based on determination, modifies the application bytecode to pass the instance of the uninitialized object class to one of a plurality of appropriate super constructor methods to instantiate an instance of the instance representation class.

BRIEF DESCRIPTION OF THE DRAWINGS

FIG. 7 illustrates example of representation object maps that may be created by the live code update process, according to one embodiment.

FIG. 8 is an example of a global class table created by the live code update process to store the modified class inheritance hierarchy, according to one embodiment.

DETAILED DESCRIPTION

I. Overview

This document describes a developer tool that allows for live code updates (LCU) while an application is running using execution platform such as the JVM. That is, it allows a software developer, after a single complete build/deploy/initialize cycle, to then quickly make iterative improvements to live running code without having to fully rebuild/re-deploy/restart (i.e., exit the application and repeat the build/deploy/initialize process). Support for live code updates as described herein does not require any modifications to the execution platform, and so default (unmodified) industry-known (existing) execution platforms such as JVM, ANDROID DALVIK Virtual Machine, MICROSOFT .Net CLR, or any other intermediate representation of the code in a format that is input to a virtual machine or a compiler backend that provides similar features can be used "off the shelf." In one example, an LCU plugin added to a build system and/or an associated LCU update service can contains all the code needed to add LCU to an application.

The LCU process brings the amount of time required to start running and testing new code down to seconds. An example implementation was able to go from modified source code on disk to an updated running program in around a second for small JAVA ANDROID applications to around 10 seconds for production SCALA services.

The LCU update service and corresponding process operate by preemptively, automatically rewriting bytecode to introduce a layer of indirection that swaps out the code of a running application to make it easy to dynamically update whenever the code is changed. The indirection is embodied both in new "representation" classes (and constituent fields and methods), and also in replacing constructs that are hard-coded into the bytecode with more flexible constructs such as representation object maps and a dynamic global class table. All manner of code modifications are handled including adding, removing and modifying fields and methods of classes (also referred to as program methods or member functions), and even changing the class hierarchy. This includes supporting arbitrary code changes and ensuring that when a developer changes a class, all objects of or related to that class are instantly updated—even reflective objects, examples of which include instances of java.lang.Class and java.lang.reflect.Method.

II. Computing Environment

Figure 1:
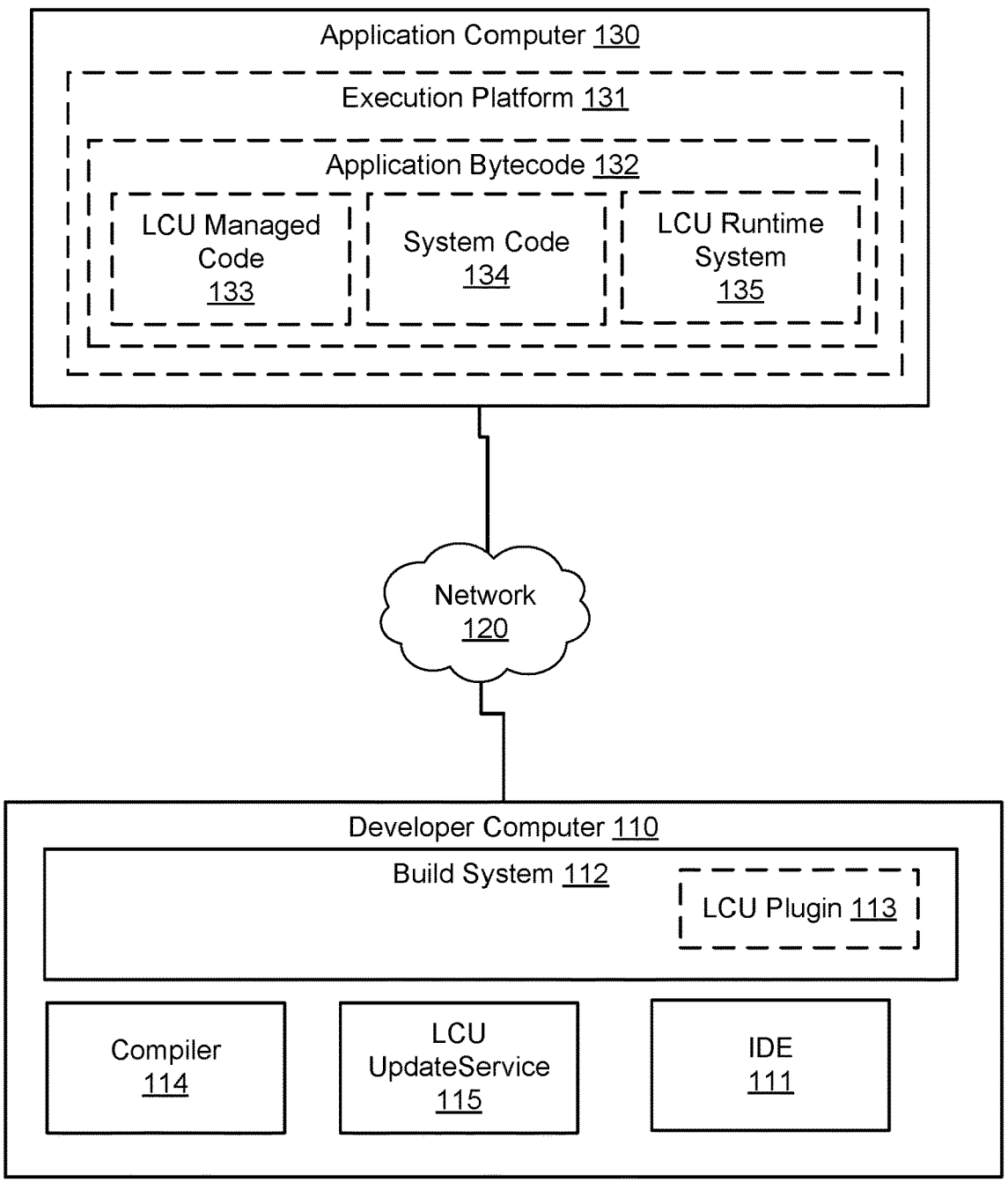
FIG. 1 is a block diagram illustrating a development environment using a live code update process, according to one embodiment.

FIG. 1 is a block diagram illustrating a development environment 100 using a live code update process, according to one embodiment. In this development environment, a software developer writes and edits source code using an integrated development environment (IDE) 111. The source code is written in one or more programming languages, and is designed to be executed using an execution platform 131. When the developer is ready to run and test a modified version of the source code, they use a build system 112. The build system 112 compiles and links the source code into application bytecode 132. An example of a traditional build process that might be executed by an example build system 112 is described below in Section III.A with respect to FIG. 2.

Figure 3:
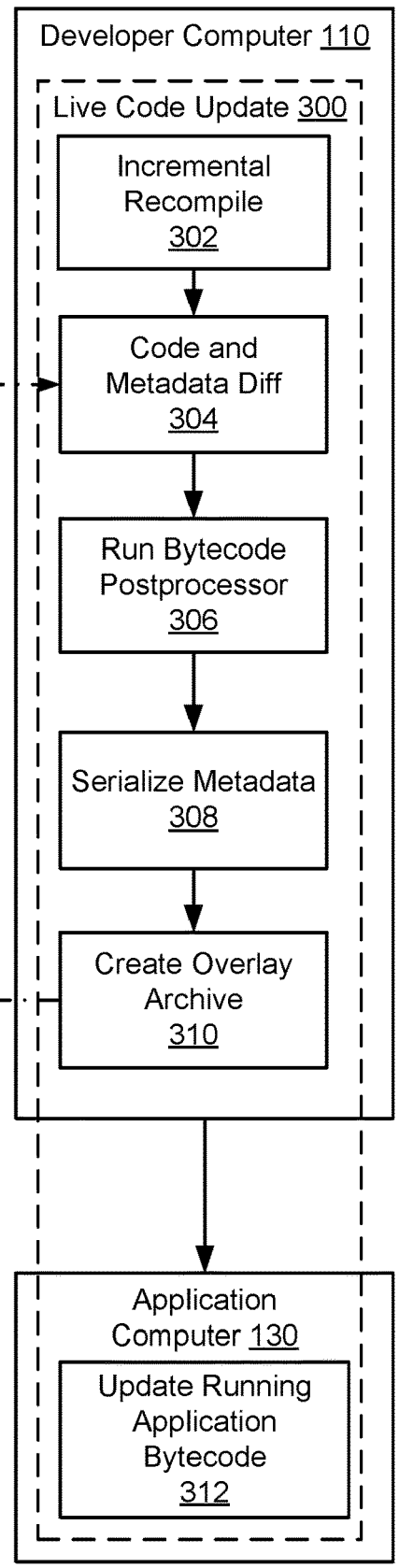
FIG. 3 is a flowchart illustrating a live code update process, according to one embodiment.

To implement the LCU process, the build system 112 includes an LCU plugin 113 that permits use of a modified build process, described below in Section III.B and Section IV with respect to FIG. 3 onward. The application bytecode 132, or portion thereof built using the LCU build process, is sent over a network 120 to an application computer 130. An example of an application computer may be a server, personal computer, notebook computer, tablet, smartphone, Raspberry Pi, or any other form factor of computer. Network 120 may be a wireless network such as WiFi, a cellular network (e.g., 3G, LTE), or multiple wired or wireless network segments (e.g., the Internet). Network 120 may also be a wired (e.g., Ethernet) network 120 connection to another physically local computer.

The application computer 130 includes an execution platform 131 that is able to run the application bytecode 132. An execution platform 131 is the underlying, unmodified hardware/software system which executes application code. Examples include: JVM, ANDROID DALVIK Virtual Machine, MICROSOFT .Net Common Language Runtime (CLR), or any other intermediate representation of the code in a format that is input to a virtual machine or a compiler backend that provides similar features. The execution platform 131 also runs an LCU runtime system 135 that is code that facilitates the LCU process, including code that loads new updates, the global class table, the replacement reflection API, etc., all of which are introduced and discussed in the following sections.

The application bytecode 132 itself includes the LCU runtime system 135, LCU managed code 133, and system code 134. LCU managed code is software code that is managed by the LCU process, and hence can be updated without restarting the program. System code, by contrast, is software code that is not managed by the LCU system, but may interact with the LCU-managed code in the regular functioning of the application.

III. One-Time Build Process

To permit an application to be updated while running, the application bytecode 132 is initially built time using a complete build process. This complete build process may occur the very first time the application is ever compiled, or any time the running application is stopped/restarted on the application computer 130. During the complete build process, portions of the LCU process are used to modify the code to be managed by LCU (the LCU managed code 133) with a layer of indirection that will support future live code updates. The complete build and modification of the application bytecode are described below in Sections III.A. and BIB, respectively. Once this is done, future updates to the live running application bytecode can be accomplished using the LCU process 300 described in Section IV with respect to FIG. 3 onward.

III.A. Complete Build/Deploy Process

Figure 2:
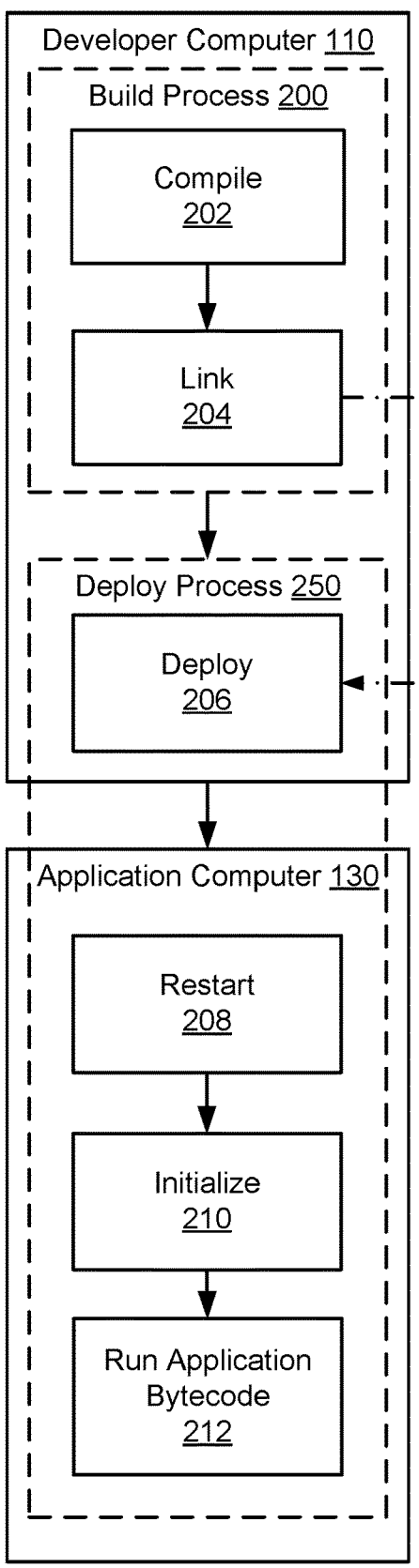
FIG. 2 is a flowchart illustrating a complete and/or initial build and deploy process, according to one embodiment.

FIG. 2 is a flowchart illustrating a complete build and deploy process 200, according to one embodiment. For the complete build process 200, the build system 112 calls a compiler 114 to compile 202 and link 204 the source code to create the application bytecode. The application bytecode is in the form of bytecode files such as JAVA bytecode files, possibly stored in an archive such as one or more JAVA Archive (JAR) files.

The deployment process 250 includes the developer computer 110 sending the application bytecode 132 to the application computer 130. It further includes the developer computer 110 instructing the application computer 130 to start (or restart if it was already running) 208 the sent application bytecode 132. The execution platform 131 and application bytecode 132 instruct the application computer 130 to initialize 210 the application bytecode to get ready to run. The application computer 130 is then used to run 212 the application bytecode 132.

III.B. Initial LCU Managed Code Setup

To set up the application bytecode to support live code updates, the complete build of the application bytecode 132 is passed after linking 204 and before deployment 206 from the build process 200 to LCU process 300. This is illustrated as the dash-dot line between FIGS. 2 and 3.

The LCU update service 115 does a bytecode metadata differential analysis (diff) 304, which for this initial build will include the complete bytecode and metadata of the application, as no previous version of the application bytecode exists to compare against (e.g., comparing against an empty program). The bytecode postprocessor within the LCU update service 115 postprocesses 306 the application bytecode 132 to incorporate the layer of indirection that will support future live code updates. The process for introducing and modifying the indirection layer is described further below with respect to Section IV.C. The LCU update service 115 serializes 308 the metadata regarding the postprocessed bytecode and creates a bytecode archive 310 to send along with the metadata to the application computer 130. These steps are discussed further below in Sections IV.D. Additional build steps may also occur such as converting JAVA bytecode to DALVIK bytecode for use on the Android mobile platforms. Other build steps are also possible.

In this complete build of the application, after these steps are performed, the postprocessed application bytecode archives are passed back to process 200 to carry out process 250.

IV. Live Code Update Process

The live code update process is described in detail in the following section. FIG. 3 is a flowchart illustrating a live code update process, according to one embodiment.

IV.A. Incremental Recompile

When the developer has completed making a set of changes to the source code of an application that is currently running, they will provide an input to the IDE 111 indicating that they would like to do a live code update. The IDE 111 receives this input, thus triggering the LCU process 300.

The LCU 300 process begins with an incremental recompile 302, that uses the unmodified compiler 114 (e.g., javac, scalac, or another) driven by a standard build system 112 that is aware of what files of the LCU managed code 133 have changed. The LCU update service 115 performs the incremental recompile 302 to only partially recompile the application bytecode 132. Any modified LCU managed code is recompiled. Unmodified LCU managed code whose compilation results depend on LCU managed code that has been modified are also recompiled. For example, if in example class A the developer changes the static type of field x; and if example class B accesses field x of an object of class A, then the code for class B is also recompiled even if class B itself has not been modified.

IV.B. Code and Metadata Diff

The LCU process 300 further includes performing a difference analysis 304 on the bytecode to identify what parts of the application bytecode and have changed versus the previous iteration of the application bytecode deployed to run on the application computer 130. Bytecode postprocessing 306 is performed on the identified portions of the bytecode that have changed.

Additionally, the LCU process 300 also performs the difference analysis on the metadata included with the application bytecode, such as the global class table (introduced below). Any differences identified through this analysis 304 may be stored as additional metadata, archived, or otherwise stored or processed to be sent to the application computer 130.

IV.C. Run Bytecode Postprocessor

Figure 4:
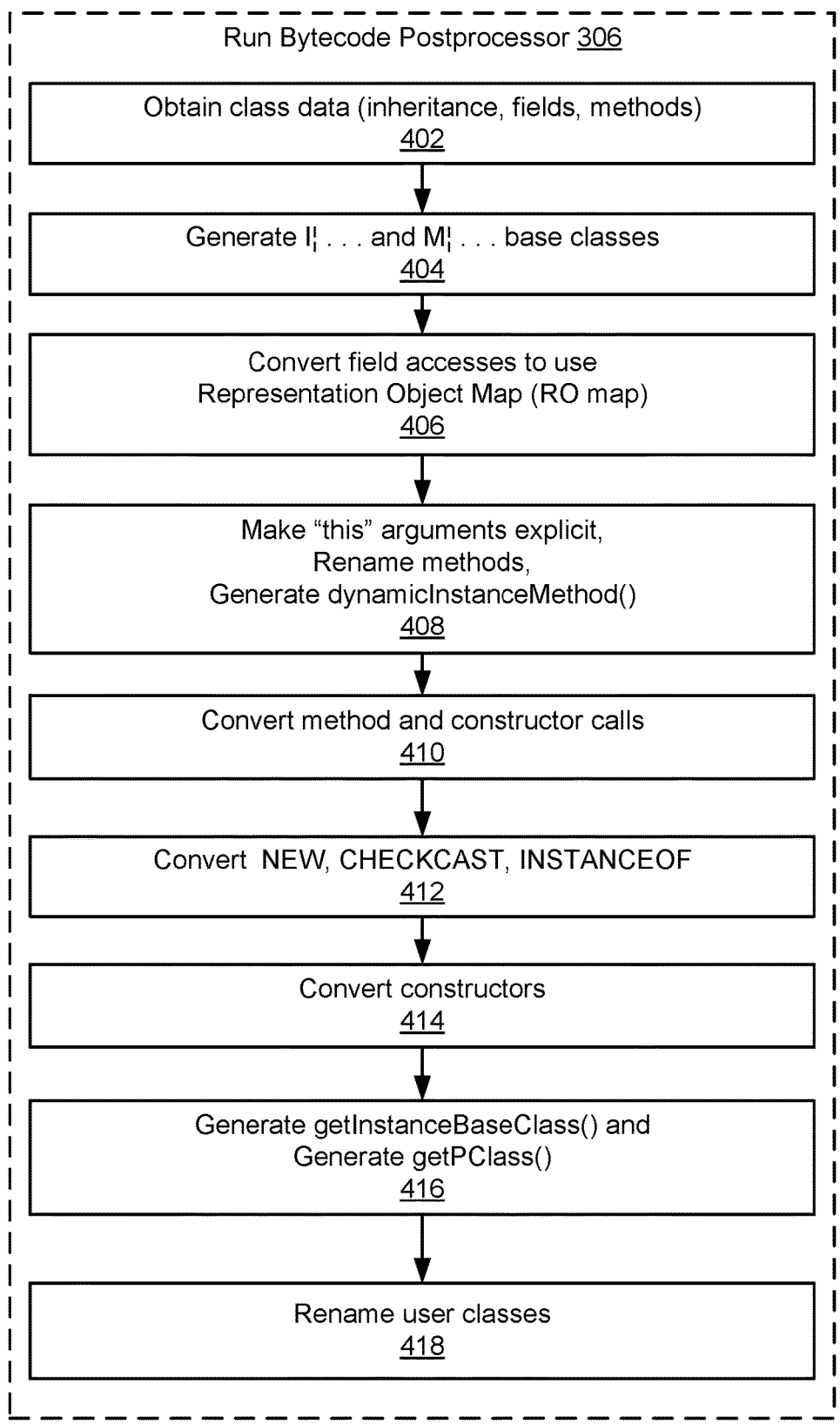
FIG. 4 is a flow chart illustrating the incremental recompile and bytecode postprocess portions of the live code update process, according to one embodiment.

FIG. 4 is a flow chart illustrating the bytecode postprocessor 306 portions of the live code update process 300, according to one embodiment. In FIG. 4, all steps in the bytecode postprocessor 306 other than step 402 can be implemented in an arbitrary order (including concurrently, followed by a merge step). Arrows and the illustrated example order are provided for sake of ordering and clarity of discussion in this section and its subsections.

To start, LCU update service 115 parses the application's bytecode to obtain 402 class data for the classes of the LCU managed code. Generally, a class is a definition of an abstract data structure consisting of fields and methods. To enforce good program architecture, a class can define access constraints on some fields and methods, to limit what other classes' methods can access them. In practice a class is used as a template used to instantiate objects of the class.

An object is an instance of a class. An execution platform 131 implements an object as a data structure consisting of some sort of identifier for the class the object is an instance of, along with a collection of instance fields associated solely with that particular object. A typical concrete representation for the collection of instance fields is a fixed-size array of primitives (numbers) and references (pointers to other objects, which can possibly be null).

Generally, classes are arranged in an inheritance hierarchy. Some classes will stand alone, such as some system classes and some user defined classes. Other classes will inherit methods or fields from other existing classes. Classes that inherit from other classes are referred to as subclasses (or child classes), while the classes they inherit from are referred to as superclasses (or parent classes).

The class data obtained by the LCU update service 115 includes the fields and methods of classes, the types of these fields and methods, as well as inheritance information that indicates which classes are standalone classes, and which are super- or sub-classes of other classes. Generally, this includes only LCU-managed classes, but it may include other classes as well.

The LCU update service 115 uses the class data to understand how the code is structured so that it can introduce the layer of indirection in the application code. An indirection layer is any mechanism by which an extra step is introduced in a lookup procedure. A lookup procedure is a method by which a name or identifier is translated to the thing that it identifies. For example, translating a field identifier of a class object to the actual memory location of the field, or translating a method identifier to the memory location of the method's bytecode, or translating a class identifier to an object containing metadata representing that class. Because of this extra step, the lookup is indirect. The indirection layer is used to introduce the opportunity to dynamically modify the lookup procedure.

Figure 6A:
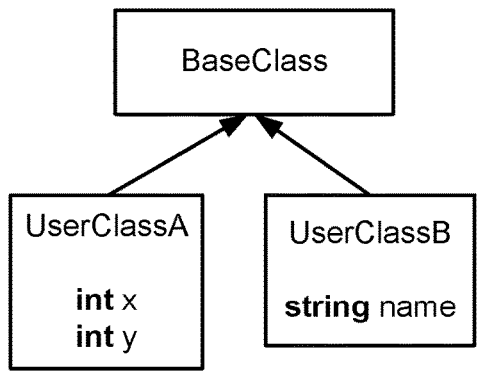
FIG. 6A is a block diagram of example classes before introduction of an indirection layer by the live code update process, according to one embodiment.

To introduce the layers of indirection, the LCU update service 115 generates new objects and classes 404. This is illustrated with respect to examples in FIGS. 6A and 6B. FIG. 6A illustrates an example system superclass named "BaseClass" and two example user-defined subclasses of that superclass, named "UserClassA" and "UserClassB." In this example, BaseClass, UserClassA, and UserClassB were present in a previous iteration of the application bytecode.

For each original class in the LCU managed code 133, the LCU update service 115 creates 404 a number of object instance representation classes (also referred to as an instance representation class) to replace the original class. Each instance representation class is a subclass of the closest system superclass that the original class is a subclass of in the class inheritance hierarchy. An instance representation class holds the fields of the original object. The instance representation class is denoted with an I¦ . . . such as example I¦BaseClass for objects of an original class that is a subclass of example system class BaseClass (such as example classes UserClassA and UserClassB) in FIG. 6B. I¦ . . . instance representation classes override all methods that they inherit and can override, and have a mechanism to explicitly call any non-abstract inherited method.

Thus for an example JAVA implementation, if the original code put an instance of UserClassA in a java.util.List, the postprocessed code will instead put an instance of I¦BaseClass in a java.util.List. I¦ . . . classes are generally not updated or replaced, but new ones may be added if the user defines new LCU-managed classes that subclass distinct system classes.

For each class I¦ . . . (e.g., I¦BaseClass) the LCU update service 115 generates a corresponding class M¦ . . . (e.g., M¦BaseClass) which serves as a base class for a family of methods and metadata representation classes (herein referred to as method representation classes) for all LCU managed classes that are subclasses of BaseClass. Off of this base class, a custom-generated method representation subclass, denoted here with an M¦<original class name>¦<version> such as M¦UserClassA¦0 for example class UserClassA in FIG. 6B, holds a postprocessed and updated version of the methods of the original class along with other metadata about the class based on changes made by a developer.

The representation classes support a wide variety of possible changes to the contents of classes or even the class hierarchy, including field changes, method changes, addition and removal of non-system classes, modification of the superclass of a non-system class, and modification of the set of interfaces implemented by a non-system class.

Later in the LCU process 300, objects of these I¦ . . . and M¦ . . . classes are used to replace "this" calls that previously instantiated objects of the original classes. The fields and methods of objects of these new I¦ . . . and M¦ . . . classes are defined via bytecode postprocessing, as described as follows. The objects of the I¦ . . . and M¦ . . . classes inserted into the code implement the indirection layer discussed above.

Using objects of the newly introduced I¦ . . . and M¦ . . . classes, bytecode postprocessing allows the LCU update service to arbitrarily change the definitions of the underlying original classes (including their associated fields and methods), so long as the changes are compatible with the system code. The output of bytecode postprocessing is new application bytecode (also referred to as postprocessed bytecode) including the modifications applied to the prior application bytecode. Generally, this new application bytecode is smaller than the full original bytecode, as it includes only those aspects of the application that have changed.

IV.C.1. Fields

The state of an object is stored in a set of fields (also referred to as member variables) associated with the object. Each field has a name, a type specifying the type of data it can store, and some additional metadata like access permissions and annotations. There two types of fields, instance fields and static fields. An instance field is associated with a particular object (instantiation) of a class. A class defines the names and types of all instance fields associated with all objects that are instances of that class. A static field is associated with a class as a whole, and is not specific to any one object that is an instance of the class. Static fields are similar to global variables in procedural programming languages. Generally, once a class is loaded, the fields present as part of the class—and of all objects that are instances of that class—cannot be changed.

To permit live code updates to the fields of a class, the LCU update service 115 moves 406 a subset of the instance fields of each object of each original class into a representation object map. Only those instance fields defined by the LCU managed original class or an LCU managed superclass are moved. Instance fields defined by a system superclass are not altered. To do this, the LCU update service replaces the instantiation of each original object of an original class within the application bytecode with the instantiation of an object of the corresponding object instance representation class. These objects have two fields. First, a value identifying the particular original class (e.g., UserClassA), referred to as the class identifier (ID), and second, the representation object map created for that object. The representation object map for an object is created and filled. Any kind of change to a field defined by the original class is supported including, for example, addition of a new field, removal of an existing field, and modification of a type of an existing field.

To use the representation object map rather than the underlying fields, the LCU update service 115 will update the application bytecode to replace all references to the original object (e.g., instances of subclasses of BaseClass), and will instead point to the corresponding representation I¦ . . . object. (e.g., instances of I¦BaseClass). Thus, the instances of the I¦ . . . classes are used to maintain the state of the running application. As will be described in the following section, Section IV.B.2., the code of methods that access these fields are automatically modified to access the elements of the representation object map rather than the object's fields.

Regarding the representation object map, a map is a key-value mapping data structure. Keys and values can be arbitrary objects (including numbers, strings, and objects of other classes). A map associates each key with zero or one values. There are no constraints on how many keys a given value may be associated with. The primary operations on a map are Get (given a key, return the associated value, or null if there is no associated value) and Put (given a key and a value, update the data structure to map the key to the value).

In practice any instance of a map data structure may be used. In one embodiment, a particular implementation of the map data structure used for the representation object maps is a hash table (also referred to as a hash map) that in some cases has desirable performance characteristics. In a specific version of that embodiment, a concurrent hash map is used. Concurrent hash maps are hash maps that allow Get and Put operations by multiple concurrent threads of execution. The use of concurrent hash maps ensures that concurrent accesses to different fields of a representation object map are safe.

Other alternatives beyond maps are also possible. For example, an array may be used instead. Alternatively, new "record" classes may be defined that contain a fixed set of fields, and for each object of a class whose fields have changed, the LCU update service 115 may dynamically replace an old version of a record class with a new version.

To fill the representation object map for each object, the key can be arbitrarily defined, and may vary by implementation. Strings, integers, or anything else may be used. In one implementation, the keys corresponding to the fields of an original class (e.g., BaseClass) are defined in the class M¦ . . . class (e.g., M¦BaseClass) in a table that maps field name strings to integers. The postprocessed application bytecode that accesses these fields directly encodes the integers from the table as the keys for a corresponding field. For example, If BaseClass.variableA has field key of 15 in the table, then a pre-postprocessing code like "((BaseClass) x)." gets postprocessed into the bytecode equivalent to "((I¦BaseClass) x).<representationObjectMap>.get(15)".

In an alternate embodiment, the key is based on a string of some combination of the original class and field name pair, such as "<original_class>.<field_name>" (e.g., "BaseClass.variableA"). FIG. 7 illustrates an example representation object map that may be created by the live code update process, according to this alternate embodiment.

The values corresponding to those keys in the map are filled with the values from the fields of the original objects. For example, in FIG. 6A UserClassA has two fields x and y, both of type int. We represent an instance of UserClassA via an instance of I¦BaseClass, since BaseClass is the closest system superclass of UserClassA. The representation object map in an instance of I¦BaseClass that represents a UserClassA object includes a key corresponding to the field UserClassA.x and another key corresponding to the field UserClassA.y, each of which maps to an object of type Integer.

The following example code shows one possible way of defining the class I|BaseClass, according to one embodiment:

```
public final class I|BaseClass extends BaseClass {
    public final int $$1cu$classId;
    public final RepresentationObjectMap<Integer, Object>$$1cu$fields;
    public I|Object(NewObject);
    public Object $$1cu$dynamicInstanceMethod(int, Object[ ]);
    public Object $$1cu$dynamicSuperMethod(int, Object[ ]);
    public int hashCode( );
    public String toString( );
    public Object clone( );
    . . .
}
```

In existing execution platforms that execute application bytecode, the instance fields of objects of original classes are represented in a fixed-size array in memory, which are inflexible if the developer wanted to change the fields of the original class while the application is running. By moving the instance fields to the representation object maps, those maps can be altered while the application is running without creating issues by changing the size of the array for instance fields in the underlying application bytecode. This allows new fields to be dynamically added to an existing object when a running program's code is updated via the live code update process. It also allows existing fields to be removed or dynamically converted to another type.

IV.C.2. Methods

A method is a program method/member function/procedure defined by a class. Method calls are very similar to field accesses. A notable difference is a method may be defined in one class, and then overridden in a child class. There are two types of methods, instance methods and static methods. Static methods are methods associated with a class which are not specific to a particular object instance of the class. When a static method is called, it is not passed an implicit "this" parameter identifying the object instance of the class that is to be acted on/with respect to for that call of the method. Instance methods are methods associated with a class that are always called with respect to a particular object instance of the class. When an instance method is called, an implicit parameter named "this" is passed to the instance method. The "this" parameter references a particular object which is an instance of the class that defined the instance method.

If a method is added or removed, then its callers will also be automatically recompiled by the build system 112. After incremental recompiling 302, the LCU process 300 will consistently update all of the corresponding classes in the application runtime as described with respect to step 312 below.

To permit live code updates to the instance methods of a class, the LCU update service 115 makes 408 "this" arguments explicitly reference particular instance representation object instances. This is done because after bytecode postprocessing, the code of methods ends up associated with M| . . . classes. As only a single instance of each M| . . . class is created during bytecode postprocessing (which is stored in the global class table, as introduced in the remainder of this section). If the bytecode kept using the implicit "this" argument in the method bytecode, "this" would reference the single instance of the M| . . . class. Instead, the bytecode needs to instead reference the particular instance of the I| . . . class that actually holds the data for this particular object instance. The following is an example that uses JAVA source code notation rather than bytecode notation:

```
class UserClassA extends Object {
    int x;
    void addToX(int y) {
        x += y;
    }
}
would transform to:
class M|UserClassA|0 extends M|Object {
    void lcu$addToX(I|Object explicitThis, int y) {
        int x = (int) explicitThis. $$lcu$fields.get(<field id of UserClassA.x>);
        x += y;
        explicitThis. $$lcu$fields.put(<field id of UserClassA.x>, x);
    }
    . . .
}
``` where $$1cu$fields is the representation object map of an instance representation object.

The LCU update service 115 also renames 408 methods by adding a prefix to the user-defined method names to make sure that they do not conflict with any of the LCU-internal fields or methods in M| . . . classes.

The LCU update service 115 also generates 408 dynamicInstanceMethod( ) 408, which is a method of an M| . . . class that (a) accepts a method ID and an array of objects as arguments, and (b) calls the method corresponding to that method ID with the objects from the array as its positional arguments (for example, if the method we want to call has two arguments, the array must contain two objects). The purpose of dynamicInstanceMethod( ) is to support implementation of an equivalent to the JVM reflection API, which is discussed further in section V below.

The LCU update service 115 takes advantage of the ability to override instance methods of super classes. For each original class (e.g., UserClassA) that was changed by a developer's update, the LCU update service 115 identifies 410 the closest system superclass that the original class (e.g., UserClassA) is a subclass of (e.g., BaseClass). The LCU update service 115 creates a single M| . . . method representation base class corresponding to the identified closest system superclass (e.g., it creates M|BaseClass).

For each original class (e.g., UserClassA) that was changed by a developer's update, the LCU update service 115 then 410 creates a custom-generated method representation subclass of the corresponding M| . . . base class which will be used to define the modified methods in the application bytecode. Any type of change to the methods of the original class is supported including, for example, modification of an existing method, addition of a new method, removal of an existing method, modification of the type of a method.

Figure 6B:
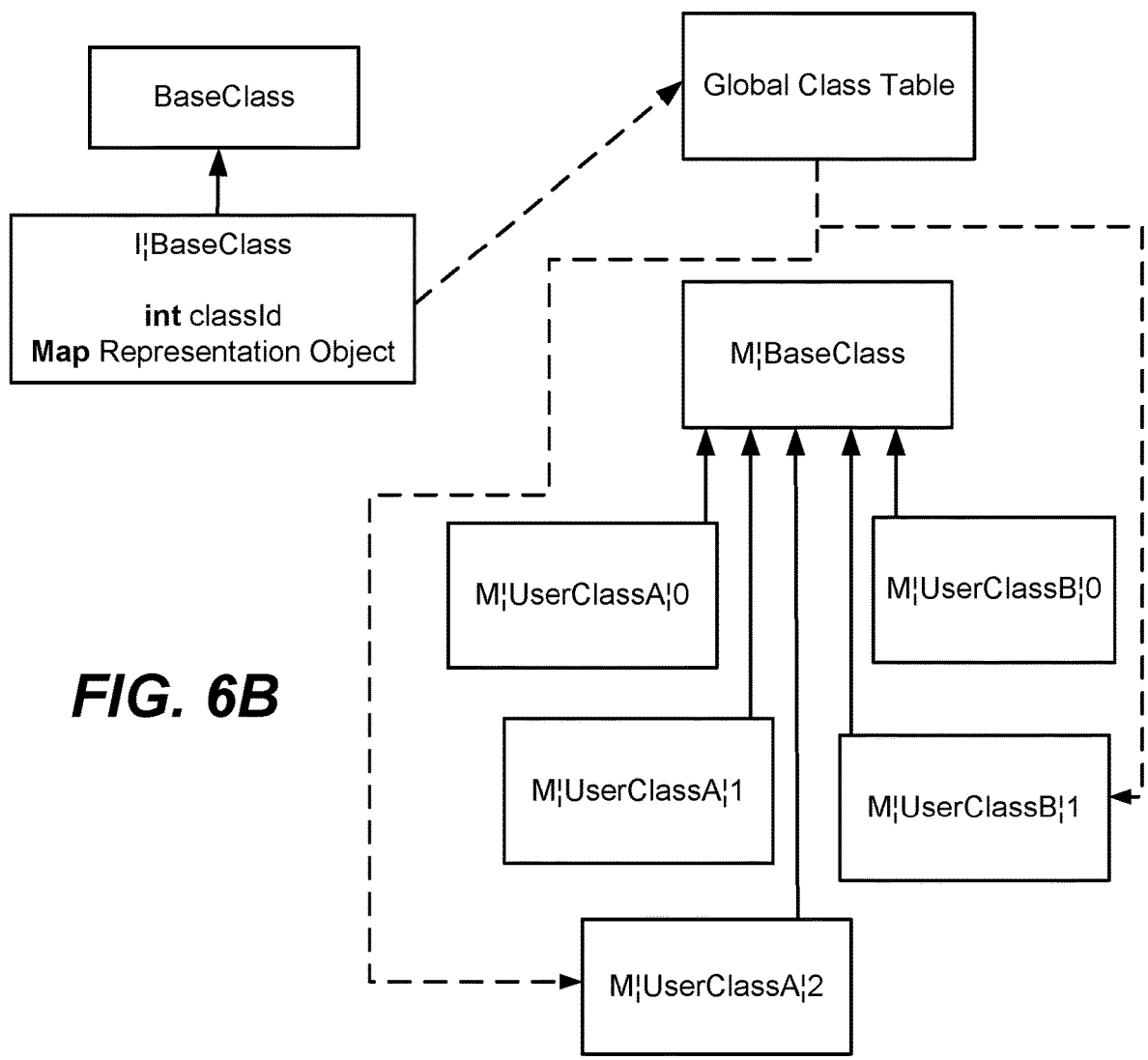
FIG. 6B is a block diagram of the example classes of FIG. 6A after several iterations of one example implementation of a live code update process, according to one embodiment.

As iterations of development may result in many changes to this same class, more than one such subclass may be generated over the iterations of development. To keep track of these iterations of development, these custom-generated subclasses are referred to using the nomenclature M|<original class>|<i> where i is a positive integer indicating the iteration of the modification. The exact notation and class naming mechanism is arbitrary, so long as each new class that is generated is distinct from every other class present in the application bytecode. Each of these method representation subclasses is a child of the M¦ . . . base class and is a sibling of the earlier iterations of method representation subclasses, as illustrated in FIG. 6B. However, again only a single instance of each iteration of custom-generated subclass M¦<original_class>¦<i> is created, as these classes are used only to call updated methods, not to store values of fields in objects within the application bytecode (this is instead the purpose of instances of the I¦ . . . object instance representation classes).

FIG. 6B is a block diagram of the example classes of FIG. 6A after the live code update process, according to one embodiment. Using the example above, the initial build of UserClassA (which is a subclass of the system class Base-Class) under LCU management creates 410 a class M¦BaseClass and a subclass of M¦BaseClass, M¦UserClassA¦0, containing a transformed version of the initial bytecode and metadata for UserClassA. Subsequent modifications to UserClassA by the developer create new subclasses of M¦BaseClass: M¦UserClassA¦1 for the first modified version of UserClassA, M¦UserClassA¦2 for the iteration after that, and so on.

IV.C.3. Inheritance Hierarchy

Due to the indirection layer created by the I¦ . . . and M¦ . . . classes and their instances, the LCU update process 300 creates and uses a global class table for use by the application bytecode to directly query the modified class inheritance hierarchy. FIG. 8 is an example of a global class table, according to one embodiment.

The global class table is a map from an identifier (ID) (or key) to a value. It may be implemented as any sort of key-value map, including an array, a hash table or a function. Each ID may simply be an index, though a more complicated identifier may also be used. Each ID identifies a particular original class. The value corresponding to an ID is an instance of the M¦ . . . class containing the current version of the postprocessed methods and metadata corresponding to the original class. Whenever a method is updated, for example when M¦UserClassA¦3 replaces M¦UserClassA¦2, the entry in the global class table corresponding to that instance of the M¦ . . . class is replaced with the most updated version as illustrated in FIG. 8.

To make use of the global class table, the LCU process 300 introduces instructions into the application bytecode 132 to reference the global class table when performing operations related to the inheritance hierarchy. For example, these instructions may replace uses of the specific instructions that exist as part of the execution platform 131 such as type casts and the JVM's "INSTANCEOF" and/or "CHECKCAST" instructions. These may be replaced with calls to static methods that do corresponding checks on the global class table rather than performing their normal functions. This way, the modified class inheritance hierarchy (in the form of the global class table) can be directly queried by the application bytecode while running.

The global class table is stored as metadata in association with the application bytecode. Other metadata in addition to the global class table may be stored as well. For example, the metadata may also include information about all super-classes (e.g., BaseClass) and interfaces of a class. The metadata may also include information about which operations of the execution platform 131 have been overridden, such as the replacement of INSTANCEOF or other similar instructions.

IV.C.4. Convert Object Constructors

The LCU update service 115 also modifies 414 the object construction process to incorporate the additional classes created by the added layer of indirection. A constructor is a special instance method associated with a class which is called to initialize the contents of a new object. The constructor cannot be called at any other time.

The LCU update service 115 modifies 414 the object construction process for LCU managed classes as follows. First, an uninitialized object of class NewObject is created that contains this same pair of fields that are used in I¦ . . . classes. As above, this includes the class ID of the original class that was to be constructed prior to bytecode postprocessing and a representation object map of an uninitialized set of fields (i.e., an empty representation object map). In the application bytecode, this is accomplished by replacing calls to create a new object (e.g., calls to NEW UserClass), to instead construct an uninitialized object (e.g., an instance of class NewObject with class ID corresponding to UserClass). For example, whereas previously an uninitialized object of class UserClassA could have been created using the instruction NEW UserClassA, the application bytecode may instead include code such as:

```
NEW NewObject
DUP
LDC <ID of UserClassA>
INVOKESPECIAL NewObject.<init> (int)
where NewObject is defined as
   public final class NewObject {
      public final int $$lcu$classId
      public final RepresentationObjectMap<Integer,
        Object>$$lcu$fields;
      public New Object(int classId) {
         this.$$lcu$classId = classId;
         this.$$lcu$fields = new RepresentationObjectMap<Integer,
           Object>( );
      }
   }
```

The instance of the NewObject class represents an incompletely constructed instance of an LCU-managed class prior to calling the constructor for its closest system superclass. For example, an instance of UserClassA will briefly be represented by an instance of NewObject in the code between where memory is allocated for the object and where the constructor for BaseClass is called.

The uninitialized object of class NewObject is passed to a method that represents the constructor method of the instantiated class that is called in the code that would have been used to construct the object prior to the addition of the layer of indirection (e.g., the constructor method of User-ClassA from the example of FIG. 6A). Example code for this step includes:

LDC <ID of UserClassA>
INVOKESTATIC LCUStaticMethods.loadFromGlobal-ClassTable(I) Object
CHECKCAST M¦UserClassA¦<i>
INVOKEVIRTUAL newInstance(NewObject, . . . )
I¦BaseClass
where "loadFromGlobalClassTable(I) Object" is a static method used to load the instance of the latest M¦UserClassA¦<i> class from the global class table.

If the superclass of the object being created is a class where the LCU process 300 has introduced the layer of indirection (e.g., consider a subclass UserClassC of class UserClassA as in the example above), the instantiated class's constructor's (e.g., UserClassC's constructor method's) call to the super constructor (e.g., UserClassA's constructor method) is replaced by a call to a representation constructor method for the method representation subclass of that super class (e.g., the method of M¦UserClass- A¦ . . . that represents the corresponding constructor of UserClassA). For example a constructor of UserClassC may appear as follows prior to post processing:

ALOAD_0
    LDC "abc"
    INVOKESPECIAL UserClassA.<init>(String)

Figure 6C:
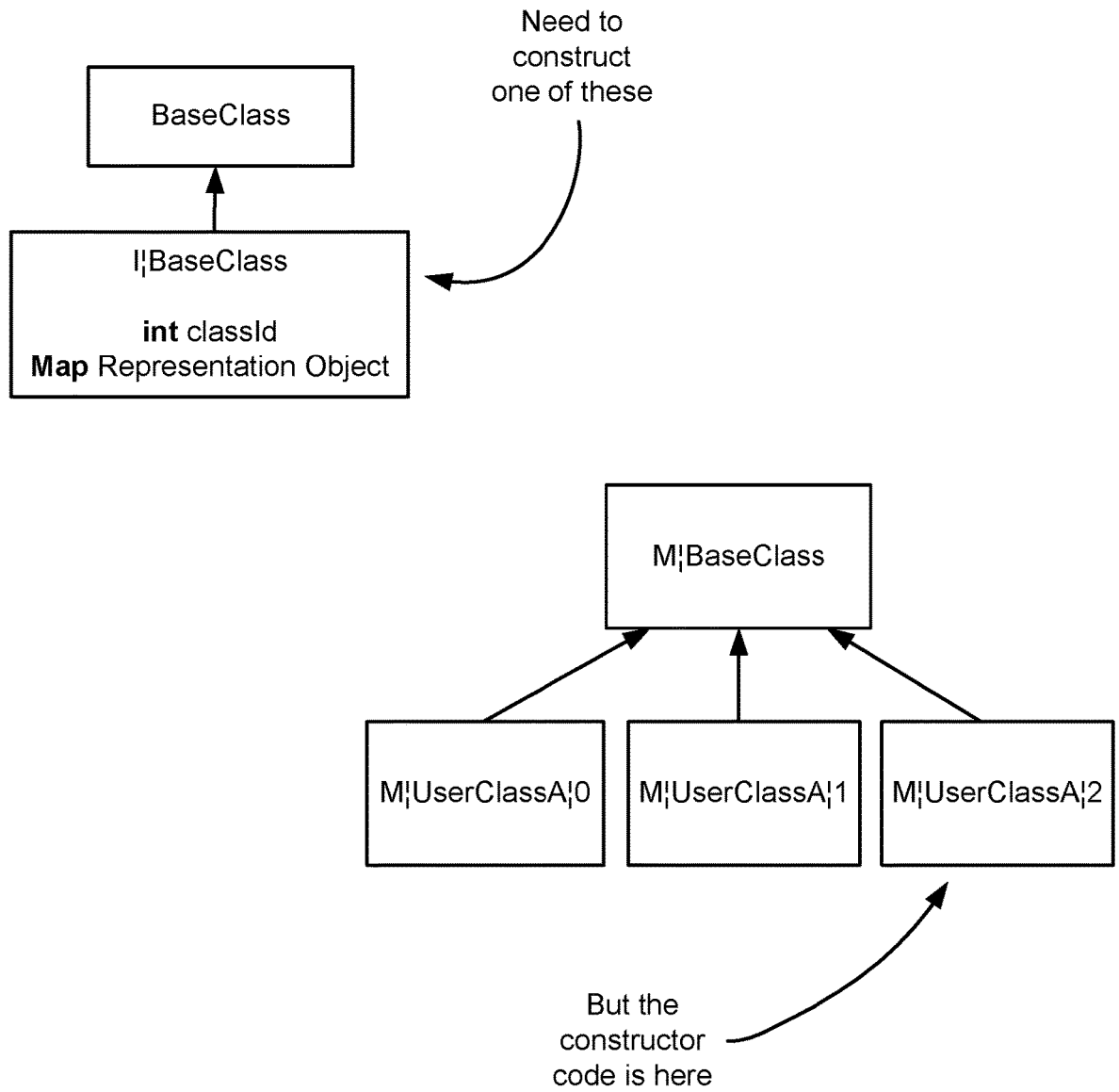
FIG. 6C is a block diagram illustrating how an object of example class UserClassA is constructed after the live code update process, according to one embodiment.

After postprocessing, the corresponding method of M¦UserClassC¦<i> that represents this constructor may appear as follows:

ALOAD_1
    LDC "abc"
    LDC <ID of UserClassA>
    INVOKESTATIC LCUStaticMethods.loadFromGlobalClassTable(I) Object
    CHECKCAST M¦UserClassA¦<j>
    INVOKEVIRTUAL newInstance(NewObject, String) I¦BaseClass
    RETURN Alternatively, if the instantiated class's (e.g., UserClassA) superclass is a system class (e.g., in our example BaseClass is a system class), then the instantiated class's constructor's call to the super constructor is replaced by code that allocates an instance representation object (I¦BaseClass in our example, which is by definition a subclass of BaseClass). In particular, the actual class ID and representation object map from the uninitialized object are passed to the constructor method of I¦BaseClass, as are any other explicit arguments to BaseClass's constructor. FIG. 6C is a block diagram illustrating how an object of example class UserClassA is constructed under this circumstance, according to one embodiment. For example a constructor of UserClassA may appear as follows prior to post processing:

ALOAD_0
    LDC "abc"
    INVOKESPECIAL BaseClass.<init>(String)

After postprocessing, the corresponding method of M¦UserClassA¦<i> that represents this constructor may appear as follows:

NEW I¦BaseClass
    DUP
    ALOAD_1
    LDC "abc"
    INVOKESPECIAL I→BaseClass.<init>(NewObject, String)
    RETURN After calling the superclass constructor, the representation constructor methods for the constructors discard the uninitialized object, and instead use the created object wherever "this" was used in the code prior to introducing the layer of indirection.

IV.C.5. Remaining Steps

Bytecode postprocessing 304 further includes a few remaining tasks, including steps of generating getInstanceBaseClass( ) and generating getPClass( ) Generating getPClass( ) is discussed in Section V below, with respect to handling reflection. In a JAVA implementation, the function getInstanceBaseClass( ) returns the java.lang.Class that represents the I¦ . . . class used to represent instances of this class. For example, M¦UserClassA¦<i>.getInstanceBaseClass( ) will return the java.lang.Class that represents I¦BaseClass.

Additional build steps may also occur such as converting code for use on a mobile platform (e.g., converting JAVA bytecode to DALVIK bytecode for use on the Android mobile platforms). Other additional build steps are also possible.

IV.D. Serialize Metadata and Create Overlay Archives

After the metadata and the new (postprocessed) application bytecode have been generated, this data must be transferred to the LCU runtime system 135 of the execution platform 131 on the application computer 130. The new application bytecode 132 is combined into an overlay archive file, which the execution platform 131 is able to load and execute. Additional metadata, such as information about how the global class table must be updated by the LCU runtime 135, is serialized, that is, it is transformed from an in-memory form to a form that is can be transmitted across the network 120.

Once the serialized metadata and overlay archive have been created, they are sent to the application computer to update the running application 312.

IV.E. Update Application Runtime

Figure 5:
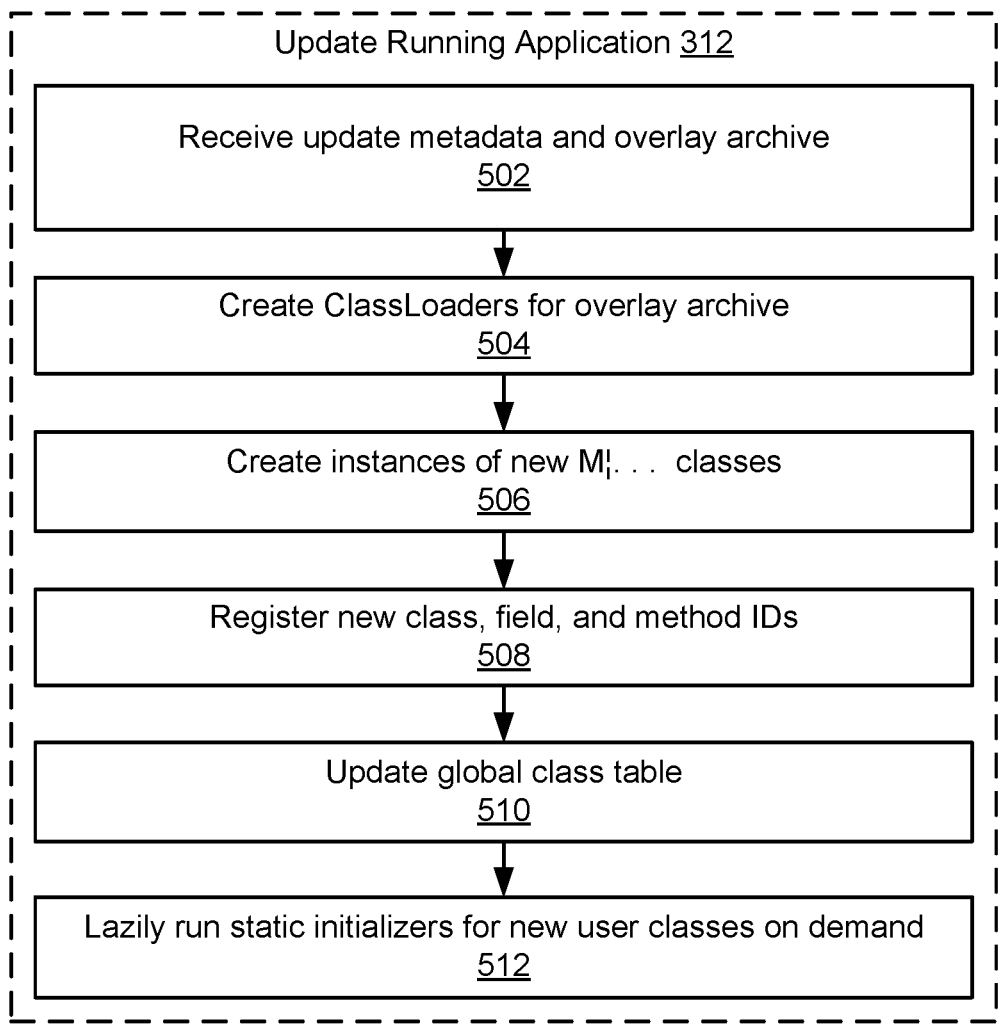
FIG. 5 is a flowchart illustrating an example process for updating the bytecode of an application while it is running as part of the live code update process, according to one environment.

FIG. 5 is a flowchart illustrating an example process for updating the application bytecode 132 of a running application using a live code update process 300, according to one environment. The application computer 130 receives 502 the updated metadata and the overlay archive from the developer computer 110. To execute the portion of the live code update process 300 on the application computer 130 the LCU runtime system 135 includes code that runs on the execution platform 131. The LCU runtime system 135 includes various items of code and metadata, including the global class table, for example. The LCU runtime system 135 also includes code that creates 504 class loaders (e.g., using the abstract class ClassLoader in JAVA, as provided by the JVM) using the overlay archive. A class loader is an object that is responsible for loading classes. Given a string object representing the name of a class (e.g., the string "M¦UserClassA¦3" represents the name of the class M¦UserClassA¦3), a class loader attempts to locate or generate data that constitutes a definition for the class.

The LCU runtime system 135 further creates 506 a new instance of each M¦ . . . class defined by the updated bytecode in the overlay archive. The LCU runtime system 135 further registers 508 the new classes, any new fields present in the representation object maps, and method identifiers present in the global class table. The registration 508 is performed using the metadata diff generated in step 304. The LCU runtime system 135 also updates the global class table 510 accordingly. The old bytecode is effectively replaced by the updating of the global class table, since references to the old M¦ . . . classes are no longer present in the global class table.

With the global class table having been updated, whenever a method is called by the live running application bytecode, the LCU runtime system 135 will reference the global class table to identify the class and method to use to execute that particular method call. Because the global class table has already been updated based on the overlay archive received for the most current iteration of the application bytecode, the global class table will point to the most current class (e.g., most current iteration of M¦UserClassA¦<i>) containing the most current version of that method.

The LCU runtime system 135 uses the occurrence of a method call to run 512 static initializers for newly defined user classes. For example, a developer may define a new class UserClassD and then perform a live code update. The postprocessed static initializer static method corresponding to UserClassD is executed the first time that postprocessed code that originally referenced UserClassD executes. This is termed lazy initialization, as the classes are updated on-use or on-demand. This is in contrast to the more common process of running static initializers for classes when the application is first run and initialized. However, as these classes did not exist when the application bytecode was first run and initialized, this is not possible. Nor would it be preferable to restart and re-initialize the application, as this would interrupt the live running program. Lazily running static initializers in this manner circumvents this while allowing the application to remain running.

For example, when a method of an instance of I|BaseClass which represents an instance of UserClassA is called, where UserClassA may or may not override a method of its superclass BaseClass, the LCU runtime system 135 takes the following steps. The postprocessed application bytecode 132 obtains the original class ID of the called object (e.g., the called object is an instance of I|BaseClass and the bytecode loads the object's class ID field), and uses it to look up metadata about the class in the global class table. The LCU runtime system 135 checks the corresponding value for that index to see whether UserClassA overrides that method. If it does not, the Runtime System 131 calls the corresponding method of the closest system superclass, BaseClass, via the instance of I|BaseClass instead.

However, if the current version of UserClassA (represented by some M|UserClassA|<i>) does override the method, the overridden method is provided as a representation method of the single object of class M|UserClassA|<i>, which accepts the instance of I|BaseClass (which represents an instance of UserClassA) as an explicit argument, along with all arguments of the original method. The LCU runtime system 135 simply calls a corresponding method of M|UserClassA|<i> with those arguments in place of calling the intended method of UserClassA. In the representation method, references to "this" in the code prior to the introduction of the indirection layer are replaced by references to the explicit representation object (i.e., instance of an instance representation class) passed in (e.g., the instance of I|BaseClass).

Referring back to the metadata passed to the application computer 130, to update the code of a class UserClassA, once the global class table is updated to indicate that a particular method has been updated and now resides in a new subclass M|UserClassA|<i> (which is a subclass of M|BaseClass), the execution platform 131 will correctly handle calling the correct version of the method within an object of the correct version of M|UserClass|<i> using the global class table.

V. Reflection

The live code update process 300 is also able to handle programming languages that support reflection. Reflection is a programming language feature that allows a program to manipulate a representation of its own structure. Reflection includes any technique to represent aspects of a program's structure in a way that is accessible to the program itself. For example, the JVM provides a built-in reflection application programming interface (API) that allows programs to inspect classes, their associated fields, methods and annotations, and their relationship to other classes. The built-in reflection API consists of a set of classes, one per program construct (e.g., java.lang.Class, java.lang.reflect.Field, java.lang.reflect.Method, etc.). The methods of these classes provide information about instances of the reflected program constructs; for example java.lang.Class has methods like: getName( ) which returns a string representation of the class's name; getDefinedFields( ) which returns an array of java.lang.reflect.Field, etc.

An example of where reflection is used is for dynamic dispatch. Dynamic dispatch is a process by which a method of an object is called indirectly, by first calling another method that runs some code to (a) determine how to invoke the intended method and (b) invoke it. An example of dynamic dispatch is when one uses reflection to find and call a method on an object rather than directly calling it.

As the LCU process 300 alters and obscures the class hierarchy of an application, without any other changes, the LCU process 300 would prevent programs that use reflection from functioning normally. To address this, the LCU process may 300 implement virtual reflection (not shown in FIG. 3). Virtual reflection includes replacing the built-in reflection API provided by the execution platform 131 by implementing a replacement reflection API to handle non-LCU managed code as it would be normally, and handle LCU-managed code differently. The replacement reflection API functions by hiding the effects of code postprocessing on results returned by the replacement reflection API so that non-LCU managed code and LCU managed code return results similar to those one would encounter when using the standard reflection API with a program for which the LCU process 300 has not been run.

The replacement reflection API is static, so it may be implemented by replacing the built-in reflection API during the initial build 200 and deployment 250 of the application bytecode. The LCU runtime system 135 instructs classes loaded into the execution platform 131 to automatically call the replacement reflection API rather than the built-in reflection API. The execution platform 131 itself does not need to be modified to make use of the replacement reflection API.

In terms of structure and content, the replacement reflection API mimics the structure of the built-in reflection API. The replacement reflection API includes code that determines whether referenced code is part of the LCU managed code, or whether it is part of system (i.e., non-LCU managed) code. For LCU managed code, the replacement reflection API provides access to and makes use of the LCU generated metadata to provide information about LCU managed classes. For non-LCU managed code, the replacement reflection API simply uses the methods of the built-in reflection API, and calls those methods instead.

The replacement reflection API may be created by starting with an equivalent copy of the built-in reflection API. Corresponding to the built-in reflection API classes like Class, Field, Method, Constructor, etc. virtual reflection abstract base classes VClass, VField, VMethod, VConstructor, etc., are added. Each of these reflection classes has two concrete implementation subclasses, with W . . . (standing for wrapped) and P . . . (standing for postprocessed) prefixes. The W . . . classes (WClass, WField, WMethod, WConstructor, etc.) wrap corresponding objects from the built-in reflection API (Class, Field, Method, Constructor, etc.). Whereas the P . . . classes (PClass, PField, PMethod, PConstructor, etc.) implement the reflection APIs in terms of data provided by LCU process 300, including the metadata and new application bytecode. The VClass object for a system class is more specifically an instance of WClass, while the VClass object for an LCU-managed class is more specifically an instance of PClass.

During postprocessing, specifically during step 416, the LCU update service 115 generates a getPClass( ) method for each LCU class metadata class, i.e., each M|UserClass|<i> class that is generated by the bytecode postprocessor. When called, this method creates a PClass with associated PField, PMethod, and PConstructor objects, as well as all runtime-visible annotations for these.

For example, consider a user-defined class UserClass, with most recent metadata class M|UserClass|<i>. Given the single instance of M|UserClass|<i>, the replacement reflection API can call its method getPClass( ) which returns an instance of PClass that describes UserClass but provides access to the postprocessed equivalent of UserClass. For example, for each method of the most recent version of the code of UserClass, this instance of PClass has an associated instance of PMethod that describes that method. Consider a method UserClass.m of class UserClass. Calling the invoke method of the PMethod corresponding to UserClass.m actually calls the corresponding postprocessed method of the instance of M|UserClass|<i>. PConstructor is analogous to PMethod. Similarly, each field (e.g., UserClassf) defined in the most recent version of UserClass has a corresponding PField object associated with the PClass object, which can be used to access that field as represented by the representation object map of an instance of the class used to represent the state of an instance of UserClass (e.g., I|BaseClass if BaseClass is the closest system superclass of UserClass).

For example, if a class UserClass initially has no fields, then the JAVA code "UserClass.getClass( ).getFields( )" will return an empty array. If, while the application is running, UserClass is modified to add two fields, a new invocation of the expression "UserClass.getClass( ).getFields( )" will return an array of two PField objects, one describing each of the fields. The same holds for a class's methods, its superclass, the interfaces it implements, access permissions, generics information; and similarly for the type and access permissions of a field, those and the argument and exception types of a method, and so on. In each case, the replacement reflection API returns information about UserClass that is sourced from the layer of indirection, but hides the indirection itself.

Tools are used, such as -javagent and ClassFileTransformer in Java, to rewrite the application code 132 to call the new replacement reflection API in place of the built-in reflection API. LCU managed and non-LCU managed code that previously referenced the built-in reflection API classes like Class, Field, Method, Constructor, etc. will instead use the virtual reflection classes, such as VClass, VField, VMethod, VConstructor, etc.

VI. Example Applications of the Live Code Update Tool

VI. A. Iterative Program Development

The LCU process supports iterative program development. Note that the LCU update service 115 and process 300 described above can be used in this same capacity for any program running on the JVM or Android platforms, without modifying the underlying platform. Similar implementations can also be used for similar platforms such as the .Net Common Language Runtime (CLR).

Note that iterative program development need not be restricted to the developer's local workstation 110 or a single server, for example as illustrated in FIG. 1. For example, the LCU process 300 can be applied directly to multiple nodes in a Map-Reduce cluster. By saving the data from a Map-Reduce pipeline in between steps, developers can use the LCU process to interactively develop each step of a Map-Reduce pipeline, without having to start over from scratch. Since Map-Reduce jobs can take several minutes to several hours to run, this approach offers a significant time, computer processor, and network resource savings.

VI.B. Test and Fix

In addition to free-form iterative development, the LCU process can be used as a component of a more regimented test and fix workflow, intended to make development of unit tests and integration tests easier, quicker and more useful for improving software quality. In this workflow, a developer would take the following steps:

Initially, a developer uses the LCU process 300 to iteratively build a program that sets up an initial state appropriate for running a particular test case. Rather than having to re-run this program from scratch each time until the developer gets to the state they want, they can use LCU to iteratively build on the existing system configuration.

Next, the developer uses the LCU process 300 to experimentally build each step of a test case. If at some point the developer finds that their program does not behave as expected, they can debug and modify the relevant parts of the program. Once they have fixed their program, they can continue experimenting with additional steps for the test case.

At some point, the developer will have built up a sufficiently large set of initialization code and test cases that they are convinced their program is of good quality.

As with other interactive development, because the developer has been building these test cases via interactive, real-time program manipulation, they (a) have gained a deeper understanding of their program behavior, and (b) have been able to create and save many more test cases and steps in a given period of time compared to the traditional compile and re-run workflow. But since the test steps have been saved in a program that the developer has been live updating, the developer also now has a set of test cases that can be re-used in the future.

VI.C. Updating Production Services

Arbitrary code modification is a powerful tool for interactive development, but not appropriate for direct use on production services. The LCU process 300 can be used in two different approaches to support updating production services.

A first approach is to apply a change restriction policy on top of the LCU process 300 to limit the kinds of changes that are allowed. This both increases confidence in what code is running on production machines, and reduces the overhead of the LCU process 300, since aspects of indirection may be omitted. For example, the LCU process 300 may be used to introduce additional logging to diagnose a bug in a production system. To prevent even this logging from overburdening a production system, performance counters could be used to automatically disable logging operations that are called too frequently.

A second approach is to use the first approach to extract enough information about the state of a misbehaving production system so that a similar configuration can be reproduced in a test environment. A test copy of the code from the production system would be modified to directly enter into this bad state. The LCU process 300 would then be used to modify the code of the running test system to match that of the production system. Finally, the LCU process 300 would be further used to experiment with proposed fixes to the production system, to determine how to automatically get the system out of the misbehaving state.

VII. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein may be performed, at least partially, by one or more processors that are temporarily configured (e.g., by software) or permanently configured to perform the relevant operations based on computer program code stored in non-transitory computer readable storage media. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art.

Unless specifically stated otherwise, discussions herein using words such as "processing," "computing," "calculating," "determining," "presenting," "displaying," "adding," "replacing," "storing," "updating," "identifying," "compiling," "instantiating" or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for enabling live code updates through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method performed by a live code update service to perform a live code update on source code of an application, the method comprising:
   receiving a request to perform a live code update of an application that is currently running on an application computer and that includes a plurality of built-in reflection API classes that implement a built-in reflection API, wherein the live code update is from an earlier version to a current version of the source code, wherein the earlier version of the source code includes a first user class, and wherein the first user class is updated in the current version of the source code;
   compiling a subset of the current version of the source code to produce an updated bytecode, including generating, in the updated bytecode, a first instance representation class that inherits from a superclass of the first user class, the first instance representation class comprising a class identifier identifying the first user class and a reference to a representation object map, wherein the representation object map for the first instance representation class stores, for each instance of the first user class, the respective instance of the first instance representation class corresponding to the instance of the first user class;
   replacing, in the updated bytecode, each instance of the first user class with a respective instance of the first instance representation class corresponding to the instance of the first user class and according to the representation object map;
   replacing, in the updated bytecode, one or more built-in reflection API classes in the plurality of built-in reflection API classes with one or more replacement reflection API classes, comprising:
      identifying, in the source code, a first call to a first method implemented by a first built-in reflection API class, wherein the first method, when executed, returns one or more properties of an instance of the first user class identified in an argument to the first method,
      identifying, in the source code, built-in reflection API classes having methods that are called with arguments identifying the instances of the first user class;
      replacing the identified built-in reflection API classes with respective replacement reflection API classes implementing the same methods as implemented by the identified built-in reflection API classes;
      replacing the first built-in reflection API class with a first replacement reflection API class that implements the first method and handles all calls to the first method in the application; and
   updating application bytecode of the application with the updated bytecode on the application computer while the application is running.

2. The method of claim 1, wherein the first replacement reflection API class implements a second method, that when executed, returns metadata of the first user class in the current version of the source code, wherein the metadata is related to the live code update of the first user class.

3. The method of claim 1, further comprising:
   replacing each built-in reflection API class with a respective replacement API class.

4. The method of claim 1, wherein each respective instance of the first instance representation class represents an instance of the first user class in the current version of the source code.

5. The method of claim 1, wherein replacing, in the updated bytecode, the one or more built-in reflection API classes in the plurality of built-in reflection API classes with the one or more replacement reflection API classes further comprises:
   identifying, in the source code, a second call to a second method implemented by a second built-in reflection API class, wherein the second method, when executed, returns one or more properties of an instance of a second user class identified in an argument to the second method, and wherein the second user class was not modified between the earlier version of the source code and the current version of the source code; and replacing the second built-in reflection API class with a first wrapper built-in reflection API class that implements the second method and handles all calls to the second method in the application.

6. A system comprising:

one or more computers and one or more storage devices storing instructions that are operable, when executed by the one or more computers, to cause the one or more computers to perform operations to perform a live code update on source code of an application, the operations comprising:

receiving a request to perform a live code update of an application that is currently running on an application computer and that includes a plurality of built-in reflection API classes that implement a built-in reflection API, wherein the live code update is from an earlier version to a current version of the source code, wherein the earlier version of the source code includes a first user class, and wherein the first user class is updated in the current version of the source code;

compiling a subset of the current version of the source code to produce an updated bytecode, including generating, in the updated bytecode, a first instance representation class that inherits from a superclass of the first user class, the first instance representation class comprising a class identifier identifying the first user class and a reference to a representation object map, wherein the representation object map for the first instance representation class stores, for each instance of the first user class, the respective instance of the first instance representation class corresponding to the instance of the first user class;

replacing, in the updated bytecode, each instance of the first user class with a respective instance of the first instance representation class corresponding to the instance of the first user class and according to the representation object map;

replacing, in the updated bytecode, one or more built-in reflection API classes in the plurality of built-in reflection API classes with one or more replacement reflection API classes, comprising:

identifying, in the source code, a first call to a first method implemented by a first built-in reflection API class, wherein the first method, when executed, returns one or more properties of an instance of the first user class identified in an argument to the first method, identifying, in the source code, built-in reflection API classes having methods that are called with arguments identifying the instances of the first user class;

replacing the identified built-in reflection API classes with respective replacement reflection API classes implementing the same methods as implemented by the identified built-in reflection API classes;

replacing the first built-in reflection API class with a first replacement reflection API class that implements the first method and handles all calls to the first method in the application; and updating application bytecode of the application with the updated bytecode on the application computer while the application is running.

7. The system of claim 6, wherein the first replacement reflection API class implements a second method, that when executed, returns metadata of the first user class in the current version of the source code, wherein the metadata is related to the live code update of the first user class.

8. The system of claim 6, the operations further comprising:

replacing each built-in reflection API class with a respective replacement API class.

9. The system of claim 6, wherein each respective instance of the first instance representation class represents an instance of the first user class in the current version of the source code.

10. The system of claim 6, wherein replacing, in the updated bytecode, the one or more built-in reflection API classes in the plurality of built-in reflection API classes with the one or more replacement reflection API classes further comprises:

identifying, in the source code, a second call to a second method implemented by a second built-in reflection API class, wherein the second method, when executed, returns one or more properties of an instance of a second user class identified in an argument to the second method, and wherein the second user class was not modified between the earlier version of the source code and the current version of the source code; and replacing the second built-in reflection API class with a first wrapper built-in reflection API class that implements the second method and handles all calls to the second method in the application.

11. One or more non-transitory computer-readable storage media encoded with instructions that, when executed by one or more computers, cause the one or more computers to perform operations to perform a live code update on source code of an application, the operations comprising:

receiving a request to perform a live code update of an application that is currently running on an application computer and that includes a plurality of built-in reflection API classes that implement a built-in reflection API, wherein the live code update is from an earlier version to a current version of the source code, wherein the earlier version of the source code includes a first user class, and wherein the first user class is updated in the current version of the source code;

compiling a subset of the current version of the source code to produce an updated bytecode, including generating, in the updated bytecode, an first instance representation class that inherits from a superclass of the first user class, the first instance representation class comprising a class identifier identifying the first user class and a reference to a representation object map, wherein the representation object map for the first instance representation class stores, for each instance of the first user class, the respective instance of the first instance representation class corresponding to the instance of the first user class;

replacing, in the updated bytecode, each instance of the first user class with a respective instance of an first instance representation class corresponding to the instance of the first user class and according to the representation object map;

replacing, in the updated bytecode, one or more built-in reflection API classes in the plurality of built-in reflection API classes with one or more replacement reflection API classes, comprising:

identifying, in the source code, a first call to a first method implemented by a first built-in reflection API class, wherein the first method, when executed, returns one or more properties of an instance of the first user class identified in an argument to the first method, identifying, in the source code, built-in reflection API classes having methods that are called with arguments identifying the instances of the first user class;

replacing the identified built-in reflection API classes with respective replacement reflection API classes implementing the same methods as implemented by the identified built-in reflection API classes;

replacing the first built-in reflection API class with a first replacement reflection API class that implements the first method and handles all calls to the first method in the application; and updating application bytecode of the application with the updated bytecode on the application computer while the application is running.

12. The computer-readable storage media of claim 11, wherein the first replacement reflection API class implements a second method, that when executed, returns metadata of the first user class in the current version of the source code, wherein the metadata is related to the live code update of the first user class.

13. The computer-readable storage media of claim 11, the operations further comprising:

replacing each built-in reflection API class with a respective replacement API class.

14. The computer-readable storage media of claim 11, wherein replacing, in the updated bytecode, the one or more built-in reflection API classes in the plurality of built-in reflection API classes with the one or more replacement reflection API classes further comprises:

identifying, in the source code, a second call to a second method implemented by a second built-in reflection API class, wherein the second method, when executed, returns one or more properties of an instance of a second user class identified in an argument to the second method, and wherein the second user class was not modified between the earlier version of the source code and the current version of the source code; and replacing the second built-in reflection API class with a first wrapper built-in reflection API class that implements the second method and handles all calls to the second method in the application.

15. The method of claim 1, wherein the method further comprises:

generating a global class table, wherein the global class tables stores, for each class in the source code, a respective instance representation class corresponding to the class generated in the updated bytecode; and replacing, in the updated bytecode, each function call to a function related to an inheritance hierarchy of the classes in the source code, with corresponding function calls to functions related to an inheritance hierarchy of instance representation classes stored in the global class table.

16. The system of claim 6, wherein the operations further comprise:

generating a global class table, wherein the global class tables stores, for each class in the source code, a respective instance representation class corresponding to the class and generated in the updated bytecode; and replacing, in the updated bytecode, each function call to a function related to an inheritance hierarchy of the classes in the source code, with corresponding function calls to functions related to an inheritance hierarchy of instance representation classes stored in the global class table.

17. The computer-readable storage media of claim 11, wherein the operations further comprise:

generating a global class table, wherein the global class tables stores, for each class in the source code, a respective instance representation class corresponding to the class and generated in the updated bytecode; and replacing, in the updated bytecode, each function call to a function related to an inheritance hierarchy of the classes in the source code, with corresponding function calls to functions related to an inheritance hierarchy of instance representation classes stored in the global class table.

18. The method of claim 15, wherein the request to perform a live code update is a first request, and wherein the method further comprises:

receiving a second request to perform a live code update, wherein the second request comprises updated source code that includes an updated first user class;

compiling the updated source code comprising the updated first user class;

identifying differences between a current version of application bytecode comprising bytecode for the current version of the first user class and compiled bytecode comprising bytecode for the updated first user class; and updating the first user class in the global class table to correspond to an instance representation class for the updated first user class.

19. The system of claim 16, wherein the request to perform a live code update is a first request, and wherein the operations further comprise:

receiving a second request to perform a live code update, wherein the second request comprises updated source code that includes an updated first user class;

compiling the updated source code comprising the updated first user class;

identifying differences between a current version of application bytecode comprising bytecode for the current version of the first user class and compiled bytecode comprising bytecode for the updated first user class; and updating the first user class in the global class table to correspond to an instance representation class for the updated first user class.

20. The computer-readable storage media of claim 17, wherein the request to perform a live code update is a first request, and wherein the operations further comprise:

receiving a second request to perform a live code update, wherein the second request comprises updated source code that includes an updated first user class;

compiling the updated source code comprising the updated first user class;

identifying differences between a current version of application bytecode comprising bytecode for the current version of the first user class and compiled bytecode comprising bytecode for the updated first user class; and updating the first user class in the global class table to correspond to an instance representation class for the updated first user class.

* * * * *